United States Patent
Hung et al.

(10) Patent No.: US 8,288,492 B2
(45) Date of Patent: Oct. 16, 2012

(54) DIFUNCTIONAL OLIGOMERS OF PERFLUORO(METHYL VINYL ETHER)

(75) Inventors: Ming-Hong Hung, Wilmington, DE (US); Bruno Ameduri, Montpellier (FR); Cyrille Andre Jean-Marie Boyer, Rochegude (FR)

(73) Assignees: E I du Pont de Nemours and Company, Wilmington, DE (US); Le Centre National de la Recherche Scientifique

( * ) Notice: Subject to any disclaimer, the term of this patent is extended or adjusted under 35 U.S.C. 154(b) by 321 days.

(21) Appl. No.: 12/209,302

(22) Filed: Sep. 12, 2008

(65) Prior Publication Data
US 2009/0105435 A1 Apr. 23, 2009

Related U.S. Application Data

(60) Provisional application No. 60/999,996, filed on Oct. 23, 2007.

(51) Int. Cl.
*C08F 16/24* (2006.01)
*C08F 216/12* (2006.01)

(52) U.S. Cl. ........ 526/247; 526/255; 570/123; 570/126; 570/136

(58) Field of Classification Search .......... 526/247, 526/255; 568/677, 678, 683; 570/123, 126, 570/136
See application file for complete search history.

(56) References Cited

U.S. PATENT DOCUMENTS

| | | | | |
|---|---|---|---|---|
| 3,642,742 A * | 2/1972 | Carlson | ........................ | 526/206 |
| 3,674,758 A * | 7/1972 | Carlson | ....................... | 525/326.2 |
| 4,243,770 A | 1/1981 | Tatemoto et al. | | |
| 4,361,678 A | 11/1982 | Tatemoto et al. | | |
| 5,081,192 A | 1/1992 | Tatemoto | | |
| 5,648,429 A * | 7/1997 | Chiodini et al. | ............... | 525/340 |
| 6,140,437 A * | 10/2000 | Kitaichi et al. | ................ | 526/247 |
| 6,174,928 B1 * | 1/2001 | Mizuide et al. | .................. | 521/46 |
| 6,750,304 B2 * | 6/2004 | Kaspar et al. | .................. | 526/209 |
| 2001/0008922 A1 | 7/2001 | Abe et al. | | |
| 2002/0032292 A1 | 3/2002 | Ikeda et al. | | |
| 2005/0215741 A1 | 9/2005 | Ameduri et al. | | |
| 2005/0250922 A1 * | 11/2005 | Irie et al. | ......................... | 526/250 |
| 2006/0052558 A1 * | 3/2006 | Morikawa et al. | ............ | 526/247 |

FOREIGN PATENT DOCUMENTS

| | | |
|---|---|---|
| EP | 1489113 A1 | 12/2004 |
| EP | 1818345 A | 8/2007 |
| WO | 9811146 A | 3/1998 |

OTHER PUBLICATIONS

Derwent Abstract—Japanese Patent Application JP2004346087, published Dec. 9, 2004.

* cited by examiner

*Primary Examiner* — Mark Eashoo
*Assistant Examiner* — Nicole M Buie-Hatcher

(57) ABSTRACT

Oligomers of perfluoro(methyl vinyl ether) with vinylidene fluoride or tetrafluoroethylene are disclosed that contain 40-90 mole percent copolymerized units of vinylidene fluoride or tetrafluoroethylene and 10-60 mole percent copolymerized units of perfluoro(methyl vinyl ether), said oligomers having two functional endgroups and having a number average molecular weight between 1000 and 25,000.

2 Claims, No Drawings

US 8,288,492 B2

DIFUNCTIONAL OLIGOMERS OF PERFLUORO(METHYL VINYL ETHER)

CROSS-REFERENCE TO RELATED APPLICATIONS

This application claims the benefit of U.S. Provisional Application No. 60/999,996 filed Oct. 23, 2007.

FIELD OF THE INVENTION

This invention relates to oligomers of perfluoro(methyl vinyl ether) with a monomer selected from the group consisting of vinylidene fluoride and tetrafluoroethylene, more particularly said oligomers contain 40-90 mole percent copolymerized units of vinylidene fluoride or tetrafluoroethylene and 10-60 mole percent copolymerized units of perfluoro (methyl vinyl ether), said oligomers having two functional endgroups and having a number average molecular weight between 1000 and 25,000 g/mole.

BACKGROUND OF THE INVENTION

High molecular weight copolymers of perfluoro(methyl vinyl ether) (PMVE) with either vinylidene fluoride ($VF_2$) or tetrafluoroethylene (TFE) are known in the art. Vulcanized elastomer parts having relatively low glass transition temperature (Tg) may be fashioned from such polymers. See for example US 2005/0215741. Such copolymers may be made in the presence of a chain transfer agent of formula RfX, wherein Rf is a perfluorinated alkyl group and X is an iodine or bromine atom, resulting in copolymers having iodine or bromine atom endgroups.

SUMMARY OF THE INVENTION

The present invention is a difunctional low molecular weight oligomer comprising copolymerized units of perfluoro(methyl vinyl ether) and a monomer selected from the group consisting of vinylidene fluoride and tetrafluoroethylene. Such an oligomer can be used as a hybridization or building block for higher molecular weight polycondensation polymers. Accordingly an aspect of the present invention is an oligomer consisting essentially of:
  A) 40 to 90 mole percent copolymerized units of a monomer selected from the group consisting of vinylidene fluoride and tetrafluoroethylene;
  B) 10 to 60 mole percent copolymerized units of perfluoro (methyl vinyl ether);
  C) 0 to 10 mole percent copolymerized units of a monomer selected from the group consisting of hexafluoropropylene and tetrafluoroethylene, with the proviso that C) can only be tetrafluoroethylene when A) is vinylidene fluoride and C) can only be hexafluoropropylene when A) is tetrafluoroethylene;
  D) 0 to 10 mole percent copolymerized units of a perfluoro vinyl ether of formula $CF_2=CFO(R_fO)_n(R_{f'}O)_mR_f$, where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms; and
  E) 0 to 10 mole percent copolymerized units of a functional fluorovinyl ether selected from the group consisting of a functional fluorovinyl ether selected from the group consisting of i) Propanoic acid, 3-[1-[difluoro[(1,2,2-trifluoroethenyl)oxy]methyl]-1,2,2,2-tetrafluoroethoxy]-2,2,3,3-tetrafluoro-, methyl ester; ii) Ethanesulfonyl fluoride, 2-[1-[difluoro[(1,2,2-trifluoroethenyl)oxy]methyl]-1,2,2,2-tetrafluoroethoxy]-1,1,2,2-tetrafluoro-; iii) 1-Propanol, 3-[1-[difluoro[(trifluoroethenyl)oxy]methyl]-1,2,2,2-tetrafluoroethoxy]-2,2,3,3-tetrafluoro-; iv) Propanenitrile, 3-[1-[difluoro[(1,2,2-trifluoroethenyl)oxy]methyl]-1,2,2,2-tetrafluoroethoxy]-2,2,3,3-tetrafluoro-; v) Hexanenitrile, 2,2,3,3,4,4,5,5,6,6-decafluoro-6-[(1,2,2-trifluoroethenyl)oxy]-; vi) Propanenitrile, 2,3,3,3-tetrafluoro-2-[1,1,2,2,3,3-hexafluoro-3-[(trifluoroethenyl)oxy]propoxy]-; vii) Propanamide, 3-[1-[difluoro[(1,2,2-trifluoroethenyl)oxy]methyl]-1,2,2,2-tetrafluoroethoxy]-2,2,3,3-tetrafluoro-; viii) 1-Propanol, 3-[1-[difluoro[(trifluoroethenyl)oxy]methyl]-1,2,2,2-tetrafluoroethoxy]-2,2,3,3-tetrafluoro-, dihydrogen phosphate; and ix) Propanoic acid, 3-[1-[difluoro[(trifluoroethenyl)oxy]methyl]-1,2,2,2-tetrafluoroethoxy]-2,2,3,3-tetrafluoro-
wherein said oligomer has a number average molecular weight of 1000 to 25,000 g/mole and wherein said oligomer has a functional group at each chain end, said functional group selected from the group consisting of iodine atoms, olefin groups, hydroxy groups, carboxylic acid groups, and —$CF_2H$ groups.

DETAILED DESCRIPTION OF THE INVENTION

The present invention is directed to difunctional oligomers having a low glass transition temperature, typically less than −30° C. Due to the reactive functional endgroups, such oligomers may be used for making higher molecular weight condensation polymers. By "difunctional" is meant that, on average, both ends of each oligomer chain have a reactive (i.e. "functional") endgroup such as, but not limited to an iodine atom, hydroxy group, carboxylic acid group, hydride group (i.e. —$CF_2H$) and olefin (including allylic) group.

The oligomers of the invention consist essentially of a) 40 to 90 (preferably 50 to 85, most preferably 60 to 75) mole percent copolymerized units of a monomer selected from the group consisting of vinylidene fluoride ($VF_2$); and tetrafluoroethylene (TFE); b) 10 to 60 (preferably 15 to 50, most preferably 25 to 40) mole percent copolymerized units of perfluoro(methyl vinyl ether), i.e. $CF_3OCF=CF_2$ (PMVE); c) 0 to 10 mole percent copolymerized units of a monomer selected from the group consisting of hexafluoropropylene (HFP) and tetrafluoroethylene (TFE), with the proviso that c) can only be tetrafluoroethylene when a) is vinylidene fluoride and c) can only be hexafluoropropylene when a) is tetrafluoroethylene; d) 0 to 10 mole percent copolymerized units of a perfluoro vinyl ether of formula $CF_2=CFO(R_fO)_n(R_{f'}O)_mR_f$, where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms; and e) 0 to 10 mole percent copolymerized units of a functional fluorovinyl ether selected from the group consisting of i) Propanoic acid, 3-[1-[difluoro[(1,2,2-trifluoroethenyl)oxy]methyl]-1,2,2,2-tetrafluoroethoxy]-2,2,3,3-tetrafluoro-, methyl ester (EVE); ii) Ethanesulfonyl fluoride, 2-[1-[difluoro[(1,2,2-trifluoroethenyl)oxy]methyl]-1,2,2,2-tetrafluoroethoxy]-1,1,2,2-tetrafluoro- (PSEPVE); iii) 1-Propanol, 3-[1-[difluoro[(trifluoroethenyl)oxy]methyl]-1,2,2,2-tetrafluoroethoxy]-2,2,3,3-tetrafluoro- (EVE-OH); iv) Propanenitrile, 3-[1-[difluoro[(1,2,2-trifluoroethenyl)oxy]methyl]-1,2,2,2-tetrafluoroethoxy]-2,2,3,3-tetrafluoro- (8-CNVE); v) Hexanenitrile, 2,2,3,3,4,4,5,5,6,6-decafluoro-6-[(1,2,2-trifluoroethenyl)oxy]- (L-8-CNVE); vi) Propanenitrile, 2,3,3,3-tetrafluoro-2-[1,1,2,2,3,3-hexafluoro-3-[(trifluoroethenyl)oxy]propoxy]- (iso-8-CNVE); vii) Propanamide, 3-[1-[difluoro[(1,2,2-trifluoroethenyl)oxy]methyl]-1,2,2,2-tetrafluoroethoxy]-2,2,3,3-tetrafluoro- (AVE); viii) 1-Propanol, 3-[1-[difluoro[(trifluoroethenyl)oxy]methyl]-1,2,2,2-tetrafluoroethoxy]-2,2,3,3-tetrafluoro-, dihydrogen phosphate (EVE-P); and ix) Propanoic acid, 3-[1-[difluoro[(trifluoroethenyl)oxy]methyl]-1,2,2,2-tetrafluoroethoxy]-2,2,3,3-tetrafluoro- (EVE-COOH). Mole percent values are based on the total number of moles of copolymerized monomer units in the oligomers. The sum of the mole percents of all of the copolymerized monomer units being 100 mole percent.

A preferred class of perfluoro vinyl ethers that may be employed in the oligomers of the invention includes compositions of the formula $$CF_2=CFO(CF_2CFXO)_nR_f$$

where X is F or $CF_3$, n is 0-5, and $R_f$ is a perfluoroalkyl group of 1-6 carbon atoms.

A most preferred class of perfluoro vinyl ethers includes those ethers wherein n is 0 or 1 and $R_f$ contains 1-3 carbon atoms. Examples of such perfluorinated ethers include perfluoro(methyl vinyl ether) (PMVE) and perfluoro(propyl vinyl ether) (PPVE).

Other useful perfluoro vinyl ethers include those of the formula $$CF_2=CFO[(CF_2)_mCF_2CFZO]_nR_f$$

where $R_f$ is a perfluoroalkyl group having 1-6 carbon atoms, m=0 or 1, n=0-5, and Z=F or $CF_3$. Preferred members of this class are those in which $R_f$ is $CF_3$, m=1, n=1, and Z=F; and $R_f$ is $C_3F_7$, m=0, and n=1.

Additional perfluoro vinyl ethers include compounds of the formula $$CF_2=CFO[(CF_2CF\{CF_3\}O)_n(CF_2CF_2CF_2O)_m(CF_2)_p]C_xF_{2x+1}$$

where m and n independently =0-10, p=0-3, and x=1-5. Preferred members of this class include compounds where n=0-1, m=0-1, and x=1.

Additional examples of useful perfluoro vinyl ethers include $$CF_2=CFOCF_2CF(CF_3)O(CF_2O)_mC_nF_{2n+1}$$

where n=1-5, m=1-3, and where, preferably, n=1.

The oligomers of the invention are viscous oils or semi-solids at room temperature and have a number average molecular weight of 1000 to 25,000; preferably 1200 to 12,000; most preferably 1500 to 5000.

Oligomers of the invention may be made by a solution, suspension or emulsion polymerization process. Such processes are well known in the art. Preferably, an emulsion process is employed wherein an inorganic peroxide (e.g. sodium or ammonium persulfate) is the initiator. Optionally a surfactant, particularly a fluorosurfactant may be included in order to improve the stability of the emulsion.

The polymerization reaction is run in the presence of a chain transfer agent of the formula I-Rf-I, wherein Rf is a perfluoroalkylene or an oxygen atom-containing perfluoroalkylene group containing between 3 and 12 carbon atoms. The preferred chain transfer agents are 1,4-diiodoperfluorobutane and 1,6-diiodoperfluorohexane and may be a mixture of diiodoperfluoroalkanes. The chain transfer agent is typically introduced to the reactor prior to initiation of the polymerization reaction and is present at a sufficient level so as to result in an iodine atom endgroup at each end of the oligomer chains. NMR spectroscopy may be used to confirm that, on average, two iodine atoms are on each polymer chain.

Iodine endgroups on the oligomers of the invention can be converted to other functional endgroups by well known chemical reactions. For example, I-copoly-I (wherein "copoly" is the oligomer chain) can be reacted with ethylene to form $ICH_2CH_2$-copoly-$CH_2CH_2I$. Hydrolysis of the di-iodoethyl groups results in the diol HO—$CH_2CH_2$-copoly-$CH_2CH_2$—OH. Oxidation of the diol will produce the di-acid product. If allyl acetate, rather than ethylene, is reacted with I-copoly-I, then di-allyl groups, and other functional groups can be obtained via known reactions.

Specific examples of oligomers of the invention include, but are not limited to I—(VF2-co-PMVE)-I; I—CH2CH2-(VF2-co-PMVE)-CH2CH2-I; CH2=CH—(VF2-co-PMVE)-CH=CH2; I-(TFE-co-PMVE)-I; I—CH2CH2-(TFE-co-PMVE)-CH2CH2-I; CH2=CH-(TFE-co-PMVE)-CH=CH2; I-(TFE-co-PMVE-co-HFP)-I; I—CH2CH2-(TFE-co-PMVE-co-HFP)—CH2CH2-I; CH2=CH-(TFE-co-PMVE-co-HFP)—CH=CH2; I-(TFE-co-PMVE-co-VF2)-I; I—CH2CH2-(TFE-co-PMVE-co-VF2)-CH2CH2-I; CH2=CH-(TFE-co-PMVE-co-VF2)-CH=CH2; CH2=CH—CH2-(VF2-co-PMVE)-CH2-CH=CH2; CH2=CH—CH2-(TFE-co-PMVE)-CH2-CH=CH2; CH2=CH—CH2-(TFE-co-PMVE-co-VF2)-CH2-CH=CH2; HO—CH2CH2-(VF2-co-PMVE)-CH2CH2-OH; HO—CH2CH2-(TFE-co-PMVE)-CH2CH2-OH; HO—CH2CH2-(TFE-co-PMVE-co-VF2)-CH2CH2-OH; HO—CH2CH2-(TFE-co-PMVE-co-HFP)—CH2CH2-OH; H—(VF2-co-PMVE)-H; H-(TFE-co-PMVE)-H; H-(TFE-co-PMVE-co-VF2)-H H-(TFE-co-PMVE-co-HFP)—H; HOOC—CH2-(VF2-co-PMVE)-CH2-COOH; HOOC—CH2-(TFE-co-PMVE)-CH2-COOH; HOOC—CH2-(TFE-co-PMVE-co-VF2)-CH2-COOH; ROOC—CH2-(VF2-co-PMVE)-CH2-COOR; ROOC—CH2-(TFE-co-PMVE)-CH2-COOR; ROOC—CH2-(TFE-co-PMVE-co-VF2)-CH2-COOR; NH2-CO—CH2-(VF2-co-PMVE)-CH2-CONH2NH2-CO—CH2-(TFE-co-PMVE)-CH2-CONH2 NH2-CO—CH2-(TFE-co-PMVE-co-VF2)-CH2-CONH2; HOOC—(VF2-co-PMVE)-COOH; HOOC-(TFE-co-PMVE)-COOH; HOOC-(TFE-co-PMVE-co-VF2)-COOH; HOOC-(TFE-co-PMVE-co-HFP)—COOH; ROOC-(VF2-co-PMVE)-COOR; ROOC-(TFE-co-PMVE)-COOR; ROOC-(TFE-co-PMVE-co-VF2)-COOR; ROOC-(TFE-co-PMVE-co-HFP)—COOR; NH2-CO—(VF2-co-PMVE)-CONH2; NH2-CO-(TFE-co-PMVE)-CONH2; NH2-CO-(TFE-co-PMVE-co-VF2)-CONH2; NH2-CO-(TFE-co-PMVE-co-HFP)—CONH2; NC—(VF2-co-PMVE)-CN; NC-(TFE-co-PMVE)-CN; NC-(TFE-co-PMVE-co-VF2)-CN; NC-(TFE-co-PMVE-co-HFP)—CN; HOCH2-(VF2-co-PMVE)-CH2OH; HOCH2-(TFE-co-PMVE)-CH2OH; HOCH2-(TFE-co-PMVE-co-VF2)-CH2OH; HOCH2-(TFE-co-PMVE-co-HFP)—CH2OH.

Oligomers of this invention have a narrow molecular weight distribution (typically much less than 1.5) and are useful in many industrial applications including hybridization block synthesis of higher molecular weight fluorinated polycondensation polymers.

EXAMPLES

Test Methods

Number average molecular weight (Mn) was determined by size exclusion chromatography (SEC). Samples were dissolved in THF. Analyses were performed with a Spectra-Physics chromatograph equipped with two PLgel 5 μm Mixed-C columns from Polymer Laboratories and a Spectra Physics SP8430 Refractive Index (RI) and UV detectors (the signals assigned to PVF$_2$-Is gave negative values in Refractive Index). Dimethylformamide (DMF) or tetrahydrofuran (THF) were used as eluents at temperature=70° C. and at temperature=30° C., respectively, with a flow rate of 0.8 mL min$^{-1}$). Standards were monodispersed poly(styrene) (PS), purchased from Polymer Laboratories or other vendors. $^{19}$F NMR with endgroup integration was also employed to check Mn.

Oligomer compositions and microstructures were determined by $^{19}$F and $^1$H NMR. The NMR spectra were recorded on a Bruker AC 400 (400 MHz) instrument, using deuterated acetone as solvent and tetramethylsilane (TMS) (or CFCl$_3$) as the references for $^1$H (or $^{19}$F) nuclei. Coupling constants and chemical shifts are given in Hz and ppm, respectively. The experimental conditions for $^1$H (or $^{19}$F) NMR spectra were the following: flip angle 90° (or 30°), acquisition time 4.5 s (or 0.7 s), pulse delay 2 s (or 5 s), number of scans 16 (or 64), and a pulse width of 5 μs for $^{19}$F NMR.

Glass transition temperature (Tg) was determined by differential scanning calorimetry (DCS). DSC measurements were conducted using a Perkin Elmer Pyris 1 instrument. Scans were recorded at a heating rate of either 10 or 20° C./minute from −100° to 50° C. Values reported were obtained after a second heating.

Decomposition temperature (Td) was determined by thermal gravimetric analysis (TGA). TGA was performed with a Texas Instrument ATG 51-133 apparatus in air or nitrogen at the heating rate of either 10° or 20° C./minute from room temperature up to a maximum 550° C.

Example 1

A 160-mL Hastelloy (HC-276) autoclave, equipped with inlet and outlet valves, a manometer and a rupture disc, was degassed and pressurized with 3.0 MPa of nitrogen for 2 hours to check for leaks. After this operation, a 2.67 kPa vacuum was applied for 30 minutes (min.) to eliminate oxygen residue. Under vacuum, the autoclave was loaded with a pre-prepared solution.

Pre-prepared solution: Na$_2$S$_2$O$_8$ (0.368 g, 16.0×10$^{-4}$ mol), 1,4-diiodoperfluorobutane (IC$_4$F$_8$I) (7.15 g, 16.0×10$^{-3}$ mol), and deionized water (80 g) were introduced into a round bottomed flask. The solution was bubbled with argon for 20 min. at 0° C. to eliminate the oxygen residue in the reaction mixture].

After the addition of the pre-prepared solution to the autoclave, the monomers were introduced by a gas transfer of perfluoro(methyl vinyl ether) (PMVE) (16.6 g, 0.100 mole) and vinylidene fluoride (VF$_2$) (9.6 g, 0.150 mole). The molar ratio VF$_2$/PMVE of the feed was 60/40. To facilitate the introduction of PMVE, the autoclave was cooled to about −40° C. in a dry ice/acetone bath. A small increase in the reactor pressure was observed (from 0 to 0.2 MPa) during the introduction of PMVE. The autoclave was then warmed to room temperature. Pressure in the autoclave increased from 0.2 to 0.5 MPa. Next VF$_2$ was introduced at room temperature. The pressure in the autoclave increased quickly (from 0.5 to 2.0-2.5 MPa). After the introduction of VF$_2$, the mixture was mixed for 10 min. without heating (agitation speed=200-300 rpm). The pressure in the autoclave slowly decreased (from 2.5 to 1.5 MPa). The autoclave was then slowly heated to 80° C. in stages in order to avoid a sudden exotherm (ca. 20° C.). Such a large exotherm would decrease the yield of the reaction. When the pressure reached 4.0-4.5 MPa, a small exotherm was observed (ca. 5° C.) and then a sharp drop in pressure was observed (from 4.5 to 0.5 MPa). The reaction was allowed to proceed for 8 hours. The autoclave was then placed in an ice bath for about 60 min. and 4 g of unreacted gas was slowly released. Yield was 85-90%. About 100 g of liquid was obtained from the depressurized autoclave. Excess monomer that had dissolved in the liquid was released under vacuum (20 mm Hg). The liquid was twice extracted with 1,1,1,3,3-pentafluorobutane and washed with water to eliminate any traces of Na$_2$S$_2$O$_8$. The extracts were dried over Na$_2$SO$_4$. Solvent was removed by distillation (ambient temperature/20 mm Hg), to obtain a viscous brownish product (yield=90-95%). To eliminate residual iodine, the liquid was washed with a solution of sodium thiosulfate (5 wt. % in water). The resulting oligomer product was colorless.

The oligomer was characterized by $^{19}$F and $^1$H NMR spectroscopy and SEC analysis as described in the Test Methods. The number average molecular weight was 1,500 g/mol (by $^{19}$F NMR); 1,800 g/mol (by SEC) and had a polydispersity index (PDI) of 1.30. The composition of the oligomer was 68 mol % VF$_2$ and 32 mol % PMVE. The glass transition temperature (Tg) was −63° C., and the decomposition temperature (Td) was 220° C.

$^{19}$F NMR [acetone-d$_6$] −38.0 to −40.0 [m, —CH2-CF2I]; −53.5 [m, —CF(OCF3)-]; −91.0 to −93.0 [m, —CH2-CF2-CH2-CF2-]; −108.0 [m, —CF2-CF2-CH2I]; −109 to −113.0 [m, —CH2-CF2-CF2-CF(OCF3), —CF2-(CF2)2-CF2-)] −113.4 [m, —CH2-CF2-CF2-CH2-CH2-]; −115.7 [m, —CH2-CF2-CF2-CH2-CH2-]; −123.0 to −124 [m, —CH2-CF2-CF2-CF(OCF3)-; —CF2-(CF2)2-CF2-)]; −126 to −129 [m, —CH2-CF2-CF2-CF(OCF3)-]; −145 to −146 [m, —CH2-CF2-CF2-CF(OCF3)-CF2)-].

$^1$H NMR: δ 2.3 [m, —CH2-CF2-CF2-CH2-CH2-CF2-]; 2.8 to 3.6 [m, —CH2-CF2-CH2-CF2-, —CF2-CH2-CF2-CF(OCF3)-]; 3.8 [q, 3JHF=14.0 Hz, —CH2-CF2I]; 4.0 [q, 3JHF=8.0 Hz, —CF2-CH2I].

Example 2

In a one-liter reactor was charged water (deoxygenated, 400 mL), sodium persulfate (1.84 g) and 1,4-diiodoperfluorobutane (35.75 g). The reactor was sealed, cooled to −40° C. and evacuated, then monomers perfluoro(methyl vinyl ether) (PMVE, 83 g) and vinylidene fluoride (VF$_2$, 48 g) were transferred into the reactor. The reactor was sealed again and the reaction was slowly heated to 80° C. over about one hour. The reaction was allowed to proceed at 80° C. for 8 hrs. After cooling, the reactor content was twice extracted with Vertrel®-XF solvent [2,3-dihydroperfluoropentane] (available from DuPont). The extracts were combined and washed with water to remove any sodium salt residue. The solution was further dried over sodium sulfate powder to eliminate water. The solvent was removed in vacuo, followed by high vacuum. 50 grams of clear, colorless viscous liquid was obtained.

The composition of the resulting oligomer was determined to be VF$_2$/PMVE=71.8/28.2 (mol %) by $^{19}$F-NMR in acetone-d6. The glass transition temperature of this oligomer was determined to be −58° C. by DSC, and the Mn was determined to be ~2,490 g/mol (with polydispersity 1.126) by SEC in DMF or THF with polystyrene as standard.

Example 3

In a one-liter reactor was charged water (deoxygenated, 400 mL), sodium persulfate (1.84 g) and 1,4-diiodoperfluorobutane (35.75 g). The reactor was sealed, cooled to −40° C. and evacuated, then monomers perfluoro(methyl vinyl ether) (PMVE, 104 g) and tetrafluoroethylene (TFE, 25 g) were transferred into the reactor. The reactor was sealed again and the reactor contents were slowly heated to 80° C. over about one hour. The reaction was allowed to proceed at 80° C. for 8 hrs. After cooling, the reactor contents were thrice extracted with Vertrel®-XF solvent. The extracts were combined and washed with water to remove any sodium salt residue. The solution was further dried over sodium sulfate powder to eliminate water. Solvent was removed in vacuo, followed by high vacuum. 33 grams of a clear, colorless viscous liquid were obtained.

The composition of the resulting oligomer was determined to be TFE/PMVE=45.6/54.4 (mol %) by $^{19}$F-NMR in acetone-d6. The glass transition temperature of this oligomer was determined to be −40° C. by DSC, and the $M_n$ was determined to be ~1,120 g/mol (with polydispersity 1.165) by SEC in DMF or THF with polystyrene as the standard.

Example 4

A 160-mL Hastelloy (HC-276) autoclave, equipped with inlet and outlet valves, a manometer and a rupture disc, was degassed and pressurized with 3 MPa bar of nitrogen to check for leaks; then, a 2.67 kPa vacuum was operated for 30 min. Under vacuum, 0.460 g (0.002 mol) of tert-butylperoxypivalate (TBPPI), 20.0 g (0.001 mol) of poly(VF$_2$-coPMVE)I (made according to the methods of the previous examples, Mn~2,000 g/mol) and 80.0 g of 1,1,1,2,2-pentafluoropentane were transferred into the autoclave. Next 0.70 g (0.025 mol) of ethylene were introduced into the mixture. The temperature of the autoclave was increased step-wise to 37° C., by heating to the following intermediate temperatures for 2 minutes each: 25° C., 30° C., 35° C. A minor exotherm of ca. 5° C. and then a sharp drop of pressure to 482 kPa was observed. It was important to maintain the temperature at 37° C. in order to avoid a sudden temperature jump and the addition of two molecules of ethylene per end, rather one molecule of ethylene per end. After 6 hours of reaction, the autoclave was placed in an ice bath for about 60 minutes and unreacted ethylene was slowly released. After opening the autoclave, about 100.0 g of a brown liquid were obtained. The product was extracted in solution of water/methylethylketone and after removal of the solvent, a viscous and brown product was obtained (yield=100%). The sample was characterized by $^{19}$F and $^1$H NMR spectroscopy and SEC analysis. The absence of signal at −40 ppm in $^{19}$F NMR spectrum confirms the addition of ethylene onto poly(VF$_2$-co-PMVE)I.

$^{19}$F NMR (deuterated acetone, ppm): −53.5 (m, —CF(OCF$_3$)—); −91.0 to −93.0 (m, —CH$_2$—CF$_2$—CH$_2$—CF$_2$— and —CH$_2$—CF$_2$—CH$_2$—CH$_2$); −108.0 (m, —CF$_2$—CF$_2$—CH$_2$I); −109 to −113.0 (m, —CH$_2$—CF$_2$—CF$_2$—CF(OCF$_3$), —CF$_2$—(CF$_2$)$_2$—CF$_2$—)) −113.4 (m, —CH$_2$—CF$_2$—CF$_2$—CH$_2$—CH$_2$—); −115.7 (m, —CH$_2$—CF$_2$—CF$_2$—CH$_2$—CH$_2$—); −123.0 to −124 (m, —CH$_2$—CF$_2$—CF$_2$—CF(OCF$_3$)—; —CF$_2$—(CF$_2$)$_2$—CF$_2$—)); −126 to −129 (m, —CH$_2$—CF$_2$—CF$_2$—CF(OCF$_3$)—); −145 to −146 (m, —CH$_2$—CF$_2$—CF$_2$—CF(OCF$_3$)—CF$_2$)—).

$^1$H NMR: δ 2.3 (m, —CH$_2$—CF$_2$—CF$_2$—CH$_2$—CH$_2$—CF$_2$— and —CF$_2$—CH$_2$CH$_2$I); 2.8 to 3.6 (m, —CH$_2$—CF$_2$—CH$_2$—CF$_2$—, —CF$_2$—CH$_2$—CF$_2$—CF(OCF$_3$)— and CF$_2$—CH$_2$CH$_2$I); 4.0 (q, $^3J_{HF}$=8.0 Hz, —CF$_2$—CH$_2$I).

Example 5

A 250 mL two-necked round-bottom flask, equipped with a condenser and magnetic stirrer, was purged with argon for 30 minutes. 40.0 g (14.3 mmoles) of I—CH$_2$CH$_2$—(VF2-co-PMVE)-CH$_2$CH$_2$—I (from Example 4) were dissolved in 30.0 g (410 mmoles) of DMF and then 1.5 g (70 mmoles) of distilled water were added to the flask. The contents were purged with argon for 20 minutes at room temperature. Then, the temperature was increased to 120° C. and hydrolysis took place for 10-12 hrs.

To transfer end-capped formate (—CH$_2$OCHO) groups (10-25 mol % confirmed by $^1$H NMR), the reaction mixture (after cooling to room temperature) was directly treated with H$_2$SO$_4$/CH$_3$OH solution (7.0 g (64 mmoles) of H$_2$SO$_4$ in 25 mL CH$_3$OH] for 8 hrs.

The total product mixture was precipitated from cold distilled water 3 times and the water layer was separated from the organic fluorinated product (as a yellow-brown viscous liquid). The latter was dissolved in acetone and dried with anhydrous Na$_2$SO$_4$ to eliminate traces of water. After filtration and evaporation of acetone, the fluorinated diol was dried under vacuum (10$^{-2}$ mm Hg/50° C.) to constant weight. The product was characterized by FTIR, $^1$H and $^{19}$F NMR spectroscopy and was found to have 97-99 mol % diol and 1-3 mol % non-converted —CH$_2$OCHO end-groups.

20 g of product obtained above, 0.6 g of NaOH and 100 ml of ethanol were introduced into a round bottom flask having a condenser. After 1 hour of reaction at 70° C., the solution was cooled to room temperature, the solvent was removed and the material was re-dissolved in 1,1,1,3,3-pentafluoropentane. The residual, unreacted NaOH was eliminated by extraction with water/1,1,1,3,3-pentafluoropentane. The solvent was then removed to obtain a poly(VF$_2$-co-PMVE) functionalized alcohol.

$^{19}$F NMR (deuterated acetone, ppm): −53.5 (m, —CF(OCF$_3$)—); −91.0 to −93.0 (m, —CH$_2$—CF$_2$—CH$_2$—CF$_2$— and —CH$_2$—CF$_2$—CH$_2$—CH$_2$); −108.0 (m, —CF$_2$—CF$_2$—CH$_2$I); −109 to −113.0 (m, —CH$_2$—CF$_2$—CF$_2$—CF(OCF$_3$), —CF$_2$—(CF$_2$)$_2$—CF$_2$—)) −113.4 (m, —CH$_2$—CF$_2$—CF$_2$—CH$_2$—CH$_2$—); −115.7 (m, —CH$_2$—CF$_2$—CF$_2$—CH$_2$—CH$_2$—); −123.0 to −124 (m, —CH$_2$—CF$_2$—CF$_2$—CF(OCF$_3$)—; —CF$_2$—(CF$_2$)$_2$—CF$_2$—)); −126 to −129 (m, —CH$_2$—CF$_2$—CF$_2$—CF(OCF$_3$)—); −145 to −146 (m, —CH$_2$—CF$_2$—CF$_2$—CF(OCF$_3$)—CF$_2$)—).

$^1$H NMR: δ2.3 (m, —CH$_2$—CF$_2$—CF$_2$—CH$_2$—CH$_2$—CF$_2$— and —CF$_2$—CH$_2$CH$_2$OH); 2.8 to 3.6 (m, —CH$_2$—CF$_2$—CH$_2$—CF$_2$—, —CF$_2$—CH$_2$—CF$_2$—CF(OCF$_3$)—; 3.8 (t, —CF$_2$—CH$_2$CH$_2$OH).

Example 6

20.0 g (0.01 mol) of poly(VF$_2$-coPMVE)I (Mn=2,000 g/mol, functionality in CF$_2$I close to 2, made by the general methods disclosed in the previous examples), 2.5 g (0.025 mol) of allyl acetate, 50 g of acetonitrile and 0.46 g of tert-butyl peroxypivalate (TBPPI) were introduced into a round bottomed flask with a condenser. The solution was bubbled with argon for 20 min at 0° C. After 8 hrs of reaction at 75° C., the solution was cooled to room temperature and the solvent was removed by distillation (quantitative yield). The copolymer was characterized by $^1$H NMR and $^{19}$F NMR. The absence of signal centered at −40 ppm confirms the addition of allyl acetate onto the poly(VF$_2$-co-PMVE)I.

$^{19}$F NMR (deuterated acetone, ppm): −53.5 (m, —CF(OCF$_3$)—); −91.0 to −93.0 (m, —CH$_2$—CF$_2$—CH$_2$—CF$_2$— and —CH$_2$—CF$_2$—CH$_2$—CHI—O—(C=O)—CH$_3$); −108.0 (m, —CF$_2$—CF$_2$—CH$_2$I); −109 to −113.0 (m, —CH$_2$—CF$_2$—CF$_2$—CF(OCF$_3$), —CF$_2$—(CF$_2$)$_2$—CF$_2$—)) −113.4 (m, —CH$_2$—CF$_2$—CF$_2$—CH$_2$—CH$_2$—); −115.7 (m, —CH$_2$—CF$_2$—CF$_2$—CH$_2$—CH$_2$—); −123.0 to −124

(m, —CH$_2$—CF$_2$—CF$_2$—CF(OCF$_3$)—; —CF$_2$—(CF$_2$)$_2$—CF$_2$—)); −126 to −129 (m, —CH$_2$—CF$_2$—CF$_2$—CF(OCF$_3$)—); −145 to −146 (m, —CH$_2$—CF$_2$—CF$_2$—CF(OCF$_3$)—CF$_2$)—).

$^1$H NMR: δ2.3 (m, —CH$_2$—CF$_2$—CF$_2$—CH$_2$—CH$_2$—CF$_2$—); 2.8 (m, —CH$_2$—CF$_2$—CH$_2$—CHI—CH$_2$O—(C=O)—CH$_3$), 2.8 to 3.6 (m, —CH$_2$—CF$_2$—CH$_2$—CF$_2$—, —CF$_2$—CH$_2$—CF$_2$—CF(OCF$_3$)—); 4.3 (q, —CF$_2$—CH$_2$—CHI—CH$_2$O—(C=O)—CH$_3$), 4.6 (CH$_2$—CF$_2$—CH$_2$—CHI—CH$_2$—O—(C=O)—CH$_3$).

Example 7

A 250 ml flask equipped with a condenser, magnetic stirrer and dropping funnel was charged with 1.5 g (0.022 mol) of zinc powder (activated by an equimolar mixture of acetic anhydride and acetic acid) and 100 ml of dry methanol. The reaction mixture was then heated up to 40° C. and 20 g (0.01 mol) of telechelic diiodobisacetate poly(VF$_2$-co-PMVE) (prepared in Example 6) was added dropwise. A few drops of bromine were also added to activate the zinc. After complete addition, the reaction mixture was refluxed for 4 hrs. Then, unreacted zinc powder was removed by filtration and methanol was evaporated. The residue was dissolved in methylethylketone, washed with 800 ml of 10 wt. % HCl and the organic layer was separated, dried with magnesium sulfate and filtered to yield α,ω-diene poly(VF$_2$-co-PMVE) (17.96 g, 90%) obtained as a colorless viscous liquid. $^1$H NMR and $^{19}$F NMR spectra confirm the chemical modification (functionality in diene was close to 2).

$^{19}$F NMR (deuterated acetone, ppm): −53.5 (m, —CF(OCF$_3$)—); −91.0 to −93.0 (m, —CH$_2$—CF$_2$—CH$_2$—CF$_2$—); −108.0 (m, —CF$_2$—CF$_2$—CH$_2$I); −109 to −113.0 (m, —CH$_2$—CF$_2$—CF$_2$—CF(OCF$_3$), —CF$_2$—(CF$_2$)$_2$—CF$_2$—)) −113.4 (m, —CH$_2$—CF$_2$—CF$_2$—CH$_2$—CH$_2$— and CH$_2$—CF$_2$—CF$_2$—CH=CH$_2$); −115.7 (m, —CH$_2$—CF$_2$—CF$_2$—CH$_2$—CH$_2$—); −123.0 to −124 (m, —CH$_2$—CF$_2$—CF$_2$—CF(OCF$_3$)—; —CF$_2$—(CF$_2$)$_2$—CF$_2$—)); −126 to −129 (m, —CH$_2$—CF$_2$—CF$_2$—CF(OCF$_3$)—); −145 to −146 (m, —CH$_2$—CF$_2$—CF$_2$—CF(OCF$_3$)—CF$_2$)—).

$^1$H NMR: δ2.3 (m, —CH$_2$—CF$_2$—CF$_2$—CH$_2$—CH$_2$—CF$_2$—); 2.8 to 3.6 (m, —CH$_2$—CF$_2$—CH$_2$—CF$_2$—, —CF$_2$—CH$_2$—CF$_2$—CF(OCF$_3$)—, CH$_2$—CF$_2$—CH$_2$CH=CH$_2$); 5.2 (m, —CH$_2$—CF$_2$—CH$_2$CH=CH$_2$); 5.6-5.8 (m, —CH$_2$—CF$_2$—CH$_2$CH=CH$_2$).

Example 8

In a reaction flask was charged 60 g of poly(VF$_2$-co-PMVE)I (made according to the methods of the previous examples, Mn~2,400 g/mol and VF$_2$/PMVE=70.7/29.3 (mole %)) and a mixed solvent of 2,3-dihydroperfluoropentane (10 mL) and anhydrous THF (20 mL). A clear yellow solution was obtained after stirring. Tributyltin hydride (16 g, 0.055 mole) was added to the solution slowly. The reaction was exothermic and the temperature of the contents of the flask reached ~55° C. After addition of trbutyltin hydride was completed, the solution turned cloudy. The reaction mixture was then stirred at 75-80° C. for 7 hours. The resulting product mixture was cooled, placed in a separatory funnel and the top layer was discarded (mainly organotin residue). The bottom organic layer was added to 2,3-dihydroperfluoropentane (100 mL), and washed with water several times. Solvent was removed in vacuo. The residual was further dried under high vacuum. The final product was obtained as a viscous oil (or a semisolid after cooling). The yield was 52 g (96-97%). NMR spectra indicated that the CF$_2$I ends were totally converted to CF$_2$H ends. The absence of signal at −40 ppm and the new signal at −222 ppm in the $^{19}$F NMR spectrum confirmed the reduction reaction of poly(VF$_2$-co-PMVE)I to poly(VF$_2$-co-PMVE)H. The new CF$_2$H ends in the oligomer showed a signal at d 6.25 ppm (multiplet) in the $^1$H NMR spectrum.

What is claimed is:

1. An oligomer consisting of:
   A) 40 to 90 mole percent copolymerized units of tetrafluoroethylene;
   B) 10 to 60 mole percent copolymerized units of perfluoro (methyl vinyl ether);
   C) 0 to 10 mole percent copolymerized units of hexafluoropropylene;
   D) 0 to 10 mole percent copolymerized units of a perfluoro vinyl ether of formula CF$_2$=CFO(R$_{f'}$O)$_n$(R$_{f''}$O)$_m$R$_f$, where R$_{f'}$ and R$_{f''}$ are different linear or branched perfluoroalkylene groups of 2-6 carbon atoms, m and n are independently 0-10, and R$_f$ is a perfluoroalkyl group of 1-6 carbon atoms; and
   E) 0 to 10 mole percent copolymerized units of a functional fluorovinyl ether selected from the group consisting of a functional fluorovinyl ether selected from the group consisting of i) propanoic acid, 3-[1-[difluoro[(1,2,2-trifluoroethenyl)oxy]methyl]-1,2,2,2-tetrafluoroethoxy]-2,2,3,3-tetrafluoro-, methyl ester; ii) ethanesulfonyl fluoride, 2-[1-[difluoro[(1,2,2-trifluoroethenyl)oxy]methyl]-1,2,2,2-tetrafluoroethoxy]-1,1,2,2-tetrafluoro-; iii) 1-propanol, 3-[1-[difluoro[(trifluoroethenyl)oxy]methyl]-1,2,2,2-tetrafluoroethoxy]-2,2,3,3-tetrafluoro-; iv) propanenitrile, 3-[1-[difluoro[(1,2,2-trifluoroethenyl)oxy]methyl]-1,2,2,2-tetrafluoroethoxy]-2,2,3,3-tetrafluoro-; v) hexanenitrile, 2,2,3,3,4,4,5,5,6,6-decafluoro-6-[(1,2,2-trifluoroethenyl)oxy]-; vi) propanenitrile, 2,3,3,3-tetrafluoro-2-[1,1,2,2,3,3-hexafluoro-3-[(trifluoroethenyl)oxy]propoxy]-; vii) propanamide, 3-[1-[difluoro[(1,2,2-trifluoroethenyl)oxy]methyl]-1,2,2,2-tetrafluoroethoxy]-2,2,3,3-tetrafluoro-; viii) 1-propanol, 3-[1-[difluoro[(trifluoroethenyl)oxy]methyl]-1,2,2,2-tetrafluoroethoxy]-2,2,3,3-tetrafluoro-, dihydrogen phosphate; and ix) propanoic acid, 3-[1-[difluoro[(trifluoroethenyl)oxy]methyl]-1,2,2,2-tetrafluoroethoxy]-2,2,3,3-tetrafluoro-
   wherein said oligomer has a number average molecular weight of 1500 to 5000 g/mole, a molecular weight distribution less than 1.5, and wherein said oligomer has a —CF$_2$H functional group at each chain end.

2. An oligomer of claim 1 wherein said copolymerized units A) are present in an amount of 60 to 75 mole percent and said copolymerized units B) are present in an amount of 25 to 40 mole percent.

* * * * *